United States Patent [19]
Fujisaki

[11] Patent Number: 5,394,207
[45] Date of Patent: Feb. 28, 1995

[54] DEVICE FOR STABILIZING IMAGES

[75] Inventor: Tatsuo Fujisaki, Yokohama, Japan

[73] Assignee: Canon Kabushiki Kaisha, Tokyo, Japan

[21] Appl. No.: 120,229

[22] Filed: Sep. 14, 1993

Related U.S. Application Data

[63] Continuation of Ser. No. 46,939, Apr. 13, 1993, abandoned, which is a continuation of Ser. No. 944,752, Sep. 14, 1992, abandoned, which is a continuation of Ser. No. 690,271, Apr. 24, 1991, abandoned.

[30] Foreign Application Priority Data

May 16, 1990 [JP] Japan .................. 2-127888

[51] Int. Cl.⁶ .................. G03B 5/00; G03B 17/00
[52] U.S. Cl. .................. 354/70; 354/430; 354/195.12; 354/202; 354/286
[58] Field of Search ........... 354/70, 79, 195.1, 195.11, 354/195.12, 195.13, 202, 430, 199, 286; 358/222, 225; 350/287; 359/557

[56] References Cited

U.S. PATENT DOCUMENTS

| | | | |
|---|---|---|---|
| 3,152,207 | 10/1964 | Emmerich | 354/70 X |
| 3,212,420 | 10/1965 | De La Cierva | 359/557 |
| 3,503,663 | 3/1970 | de La Cierva et al. | 354/70 X |
| 3,941,451 | 3/1976 | Humphrey | 350/287 X |
| 4,769,668 | 9/1988 | Ishikawa et al. | 354/286 X |
| 4,829,333 | 5/1989 | Inoue et al. | 354/286 X |
| 4,965,619 | 10/1990 | Shikaumi et al. | 354/43 X |
| 5,107,293 | 4/1992 | Sekine et al. | 354/430 |
| 5,117,246 | 5/1992 | Takahashi et al. | 354/202 |
| 5,192,964 | 3/1993 | Shinohara et al. | 354/202 |

FOREIGN PATENT DOCUMENTS

61-223819  5/1990  Japan .

*Primary Examiner*—Michael L. Gellner
*Assistant Examiner*—Jae N. Noh
*Attorney, Agent, or Firm*—Fitzpatrick, Cella, Harper & Scinto

[57] ABSTRACT

A device suppresses blur by light refraction in a photographically formed image, thereby stabilizing the image. The device includes a detector for detecting whether a conversion lens for varying the focal length of the photographic lens is attached in front of the device or not, or a setting device for setting the presence or absence of such a conversion lens, the amount of light refraction being varied in accordance with the output of the detector or the setting device.

13 Claims, 7 Drawing Sheets

DEVICE FOR STABILIZING IMAGES

This application is a application Ser. No. 08/046,939 filed Apr. 13, 1993, which is a continuation of application Ser. No. 07/944,752, filed Sep. 14, 1992, which is a continuation of application Ser. No. 07/690,271, filed Apr. 24, 1991, all now abandoned.

BACKGROUND OF THE INVENTION

1. Field of the Invention

This invention relates to a blur suppressing device for compensating for any blur in an image caused by a movement of the camera, thereby stabilizing the image.

2. Description of the Related Art

When taking pictures while on a vehicle, ship or airplane, or even while walking one is likely to experience a violent jolting movement which may obscure the image. This is particularly true when the exposure time is long. A jolting movement in such a situation makes it impossible to obtain a picture of satisfactory quality.

When photographing with a single-lens reflex camera equipped with a lens having a long focal length, it is a general practice to attach the camera to a tripod. However, since this limits maneuverability, it is sometimes necessary to hand-hold the camera, thus risking a blurred image. It is well known in the art, that the higher the magnification of a camera lens, the more difficult it is to obtain satisfactory image quality. Recently, a great deal of attention has been directed to this problem.

Various optical image stabilization systems for avoiding such a problem have been proposed. In one well-known system, for example, a bellows, in which a transparent liquid having a predetermined index of refraction is sealed, is provided in front of the photographic lens. The angle defined by the incident and exit planes of this bellows is so controlled that the angle of optical refraction of the wedge defined by this bellows serves to compensate for any change in position caused by jolting of the photographic lens. Japanese Patent Laid-Open Publication No. 61-223819 discloses an example of such a system.

A conversion lens is generally adopted where it is desired that the focal length of the photographic lens be enlarged. There are two systems of arranging such a conversion lens. In one system, the image blur suppressing device is provided in front of the conversion lens, and, in the other, the image blur suppressing device is provided behind the conversion lens or within the photographic lens.

In the case where the blur suppressing device is provided in front of the conversion lens, there is no need to vary the amount of compensation of the blur suppressing device, i.e., the refraction amount of the optical path, in accordance with whether the conversion lens is attached. However, there is the problem that the diameter of the suppressing device has to be large in order to avoid vignetting of the effective photographic luminous flux.

The latter system might be more advantageous in that it allows the diameter of the suppressing device to be smaller than in the former system. However, the amount of compensation effected by the image blur suppressing device when the conversion lens means is attached differs from that when it is not, thus making it impossible to effect blur suppression satisfactorily.

SUMMARY OF THE INVENTION

It is the object of this invention to provide a device or system which makes it possible to obtain a stable image even when conversion lens means is attached.

The present invention pertains to a photographic system for stabilizing a photographically formed image comprising a photographic lens means for forming the image, a light refraction means for causing light refraction in order to stabilize the image, a conversion lens means for converting the focal length of the photographic lens means, and a means for varying the light refraction amount of the light refraction means in accordance with whether the conversion lens means is attached.

The invention in another aspect pertains to an image stabilizing device which is provided between a photographic lens and a conversion lens means for converting the focal length of the photographic lens and which is adapted to stabilize images formed by the photographic lens comprising a light refraction means for causing light refraction, and a means for varying the light refraction amount of the light refraction means in accordance with whether the conversion lens means is attached.

Further characteristics of this invention will be described below.

DETAILED DESCRIPTION OF THE PREFERRED EMBODIMENTS

Figure 1:
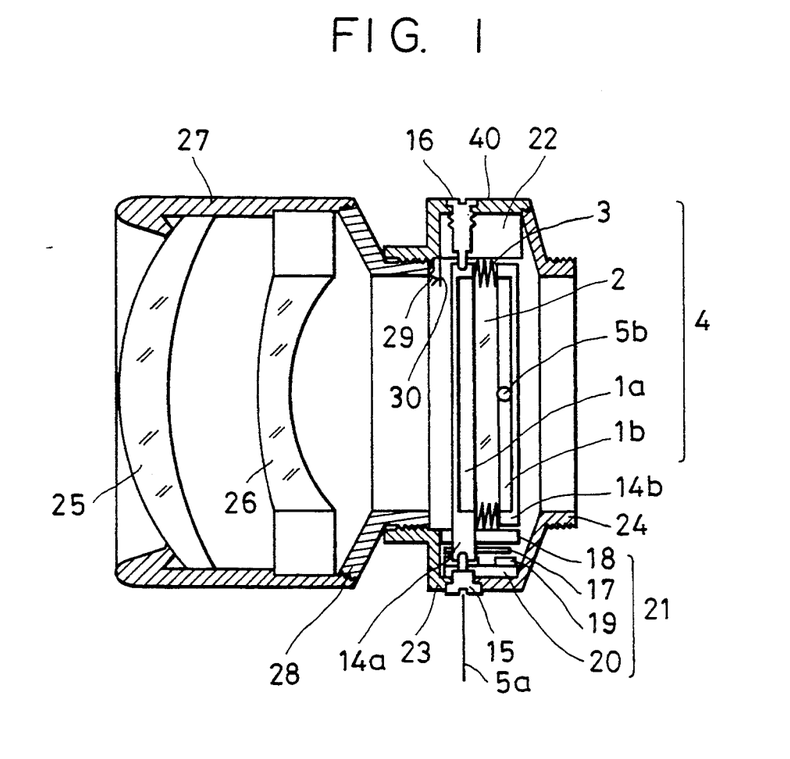
FIG. 1 is a sectional view showing an image blur suppressing device in accordance with this invention and a conversion lens.
Figure 2:
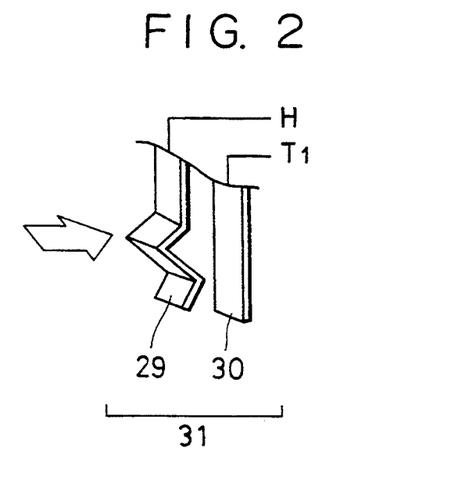
FIG. 2 is a perspective view of a switch provided in the image blur suppressing device and adapted to detect whether the conversion lens is attached.
Figure 3:
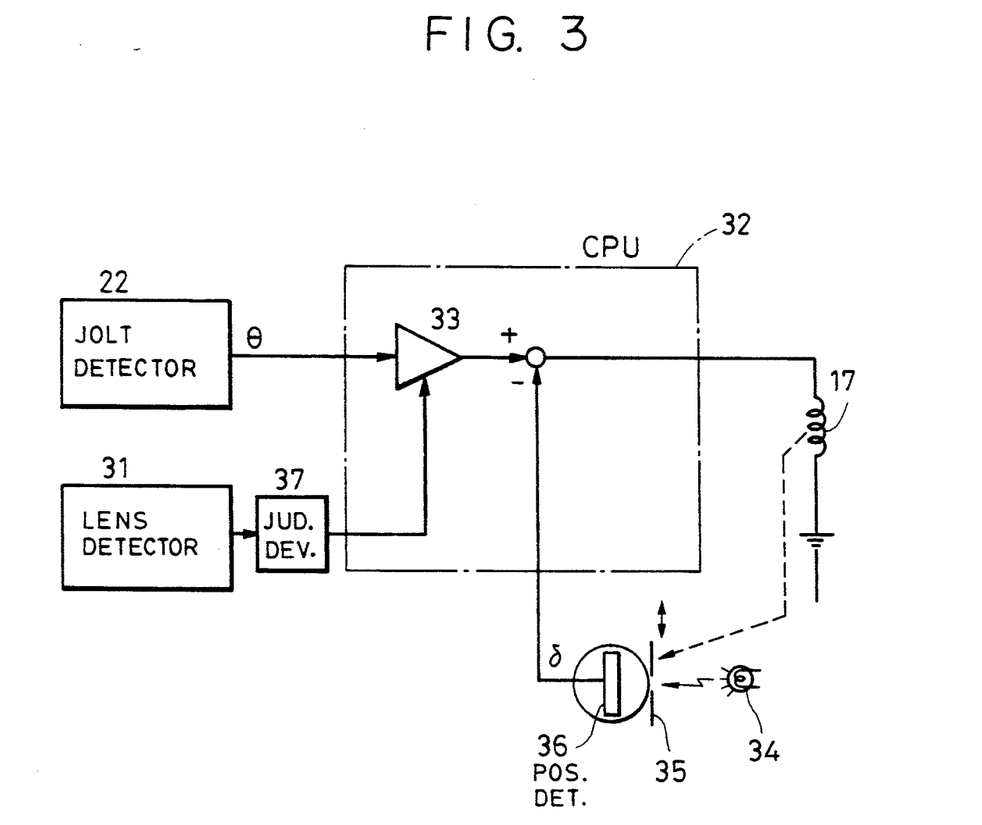
FIG. 3 is a circuit diagram showing a drive circuit for varying the apex angle of a variable-apex-angle prism.

FIGS. 1 to 3 show a first embodiment of this invention. The reference numeral 4 indicates a variable-apex-angle prism comprising transparent plates 1a and 1b; a transparent liquid 2 such as silicon oil; and a bellows-like sealing member 3.

The variable-apex-angle prism 4 is held between ring-like holding frames 14a and 14b and is positioned in front of a photographic lens (not shown), which is to be situated on the right-hand side of FIG. 1. Pins 15 and 16 protruding from the barrel engage holes provided at the ends of the holding frame 14a. Thus, the holding frame 14a is swingable on a swing axis 5a relatively friction free. Further, firmly attached to one end of the holding frame 14a at a position behind the swing axis 5a (as seen from the direction perpendicular to the plane of FIG. 1) is a flat type coil 17. On each side of the coil 17 are respectively provided a yoke 18, and a magnet 19 and a yoke 20, separated by air gaps large enough to prevent them from coming into contact with the coil 17. The yokes 18 and 20 form a magnetic circuit which is closed with respect to the magnetic flux of the magnet 19, which magnetic flux penetrates the coil 17 at high density. The coil 17, the magnet 19, and the yokes 18 and 20 constitute, as a whole, an actuator 21 for generating a horizontal thrust (as seen in FIG. 1), in other words, a torque around the swing axis 5a. The reference numeral 22 indicates a jolt detector consisting, for example, of an acceleration detector and adapted to detect the angle of any rotation around an axis parallel to the axis 5a. The reference numerals 23 and 24 indicate barrel members. The front section of the member 23 is formed as a thread for mounting a conversion lens, and the rear section of the member 24 is formed as a thread for mounting the photographic lens. It is not necessary for these two threads to be of the same type.

In the preceding paragraph, the drive structure for the front transparent plate 1a and the corresponding angular displacement detector structure have been described. The drive structure for the rear transparent plate 1b and the corresponding detector structure are spaced 90° away from the above structures regarding the front transparent plate 1a with respect to the optical axis, and are constructed basically the same, so that a detailed description of the structures regarding the rear transparent plate 1b will be omitted here. The reference numeral 5b indicates a swing axis for the transparent plate 1b. Further, a drive amount detection device for detecting any variation in the apex angle of the variable-apex-angle prism is also provided, however, this detection device is not shown in FIG. 1. This detection device uses light emitting and light receiving elements.

The reference numerals 29 and 30 indicate armatures constituting a conversion lens detecting device 31 for detecting whether the conversion lens is attached. FIG. 2 is an enlarged view of these armatures. The armature 29 is an elastic conducting member which is adapted to deflect when it receives from the conversion lens means a force in the direction indicated by the arrow. When it deflects, this armature 29 comes into contact with the armature 30 and conducts. Thus, this armature 29 constitutes a so-called push switch. The fixed end of the armature 29 is supplied with a high level signal H from a judgment device described below. When the armature 29 attains the conducting state, a high level signal T1 is supplied from the fixed end of the armature 30 to the judgment device mentioned above. The reference numerals 25 to 28 indicate the components of a so-called conversion lens, which is attached to the front surface of the image blur suppressing device by means of a thread provided in the rear section of the lens barrel 28 thereof. The lenses 25 and 26 respectively have positive and negative refracting powers. When the conversion lens is attached, a part of the above-mentioned lens barrel 28 is pressed against the armature 29, thereby causing the conversion lens detector 31 to transmit a detection signal T1 to the judgment device.

FIG. 3 is a block diagram showing a control circuit used in this embodiment. A detected-angle signal $\theta$ from the above-mentioned jolt detector 22 is supplied to a CPU 32 and amplified by an amplifier 33 before it is supplied to the coil 17. The variable-apex-angle prism 4 is driven in accordance with the voltage of the signal thus supplied to the coil 17. The relationship between the deflection angle $\phi$ of the optical axis and the drive angle (the apex angle) $\delta$ of the prism 4 can be expressed as: $\phi = (n-1)\delta$, where n represents the index of refraction of the transparent liquid. If $\phi$ is equal to $\theta$ when no conversion lens is attached in front of the image blur suppressing device, the influence of the jolt is cancelled and the image blur is suppressed. Thus, to avoid a blurred image, the apex angle of the prism 4 may be so controlled that the relationship: $\delta = \theta/(n \times 1)$ is satisfied. To attain high precision and a high level of followup performance, the drive angle $\delta$ of the above variable-apex-angle prism 4 is detected by means of a drive amount detection device, which is composed, as shown in FIG. 3, of a slit 35 adapted to move with the movable coil 17, a light emitting element 34, and a position detecting element 36 for detecting the position of the light emitted from the light emitting element 34 and passing through the slit 35. The detection result is subtracted from a command signal. Thus, a so-called feedback control is effected. If, in this case, the amplification factor of the amplifier 33 is $1/(n-1)$, the blur suppression can be effected satisfactorily.

Assuming that a conversion lens having an angular magnification of $\gamma$ is attached in front of the image blur suppressing device, the requisite deflection angle $\phi$ of the optical axis is $\gamma\theta$, so that the relationship: $\delta = \gamma\theta/(n-1)$ must be satisfied. That is, the amplification factor of the amplifier 33 must be changed from $1/(n-1)$ to $\gamma/(n-1)$. In this embodiment, it is assumed that a tele-conversion lens means of approx. 1.4×magnification ($\gamma = 1.4$) are most frequently used as the conversion lens. Accordingly, when the signal T1 from the above-mentioned conversion lens detection becomes a high level signal, the amplification factor of the amplifier 33 is changed to 1.4× through the intermediary of the judgment device 37. In the case where a wide conversion lens is attached, the total synthetic focal length is relatively small, so that the influence of any camera shake is not so conspicuous, and the influence of an error in amplification factor is relatively small. In the case, for example, of a tele-conversion lens of 2 × magnification, the amplification factor is strictly in error. However, only approx. 30% thereof acts as an error factor, which means 70% thereof is suppressed. It can be concluded from the above, that, when the attachment of a conversion lens is detected, the amplification factor of the amplifier 33 is changed by uniformly assuming a fixed angular magnification $\gamma (\gamma > 1)$. That is, the ratio of the operational amount for compensation to the deflection angle (i.e., the vibration sensitivity) is changed, thereby making it possible to obtain a stable image of satisfactory quality.

Power may be supplied from a detachable power source provided in the photographic apparatus, or, alternatively, power supply may be effected by providing a contact between the photographic apparatus and the power source. Of course, it is possible for the image blur suppressing device to be equipped with a dedicated power source.

While in the above embodiment the image blur suppression is effected by changing the amplification constant in the CPU, this should not be construed as restrictive. The same effect can also be attained, for example, by switching the gain of the analog amplifier or changing the output level of the jolt detector.

Figure 4:
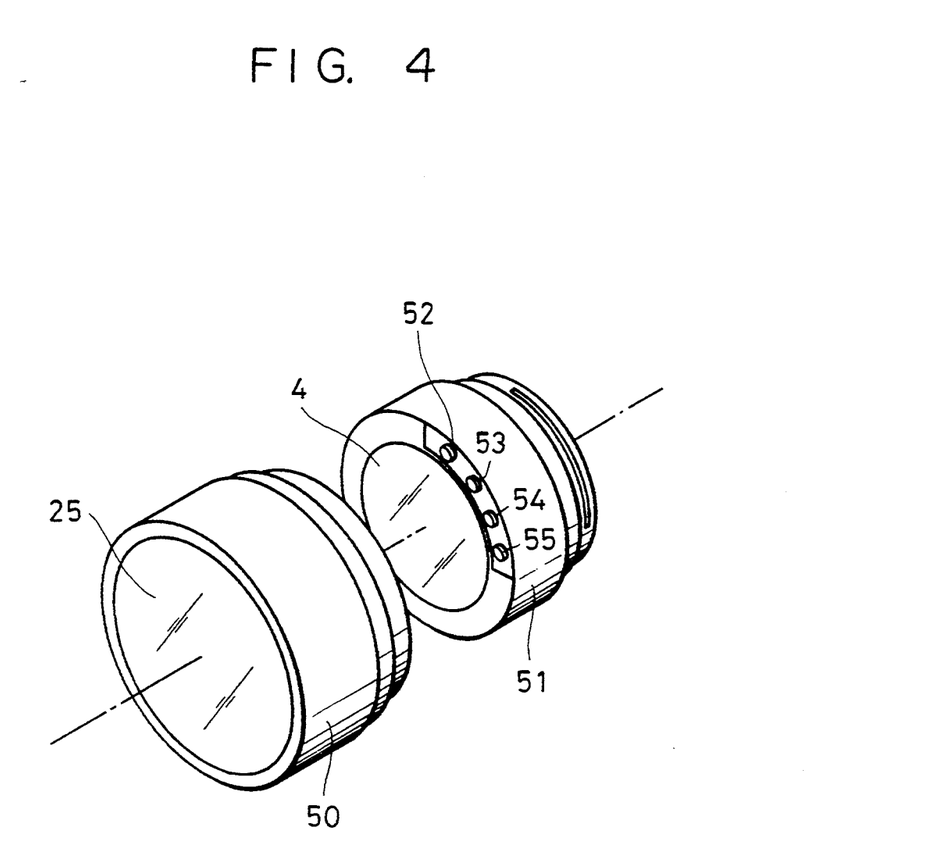
FIG. 4 is a perspective view showing an image blur suppressing device in accordance with this invention and a conversion lens.
Figure 5:
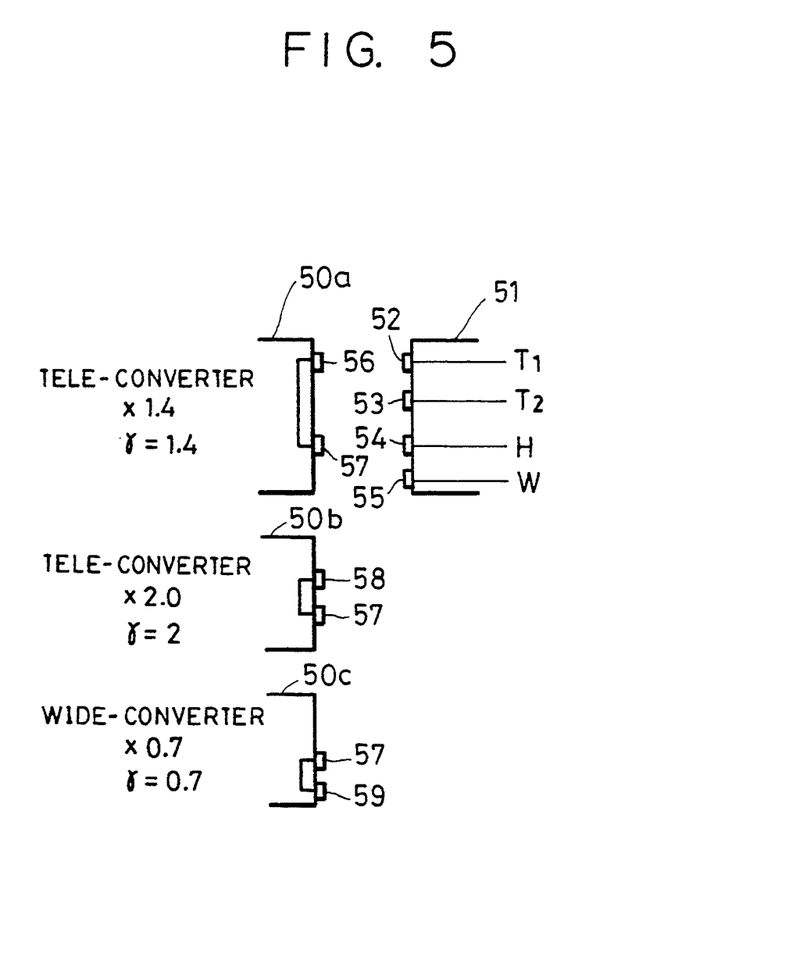
FIG. 5 is a diagram showing a system for distinguishing the type of conversion lens.
Figure 6:
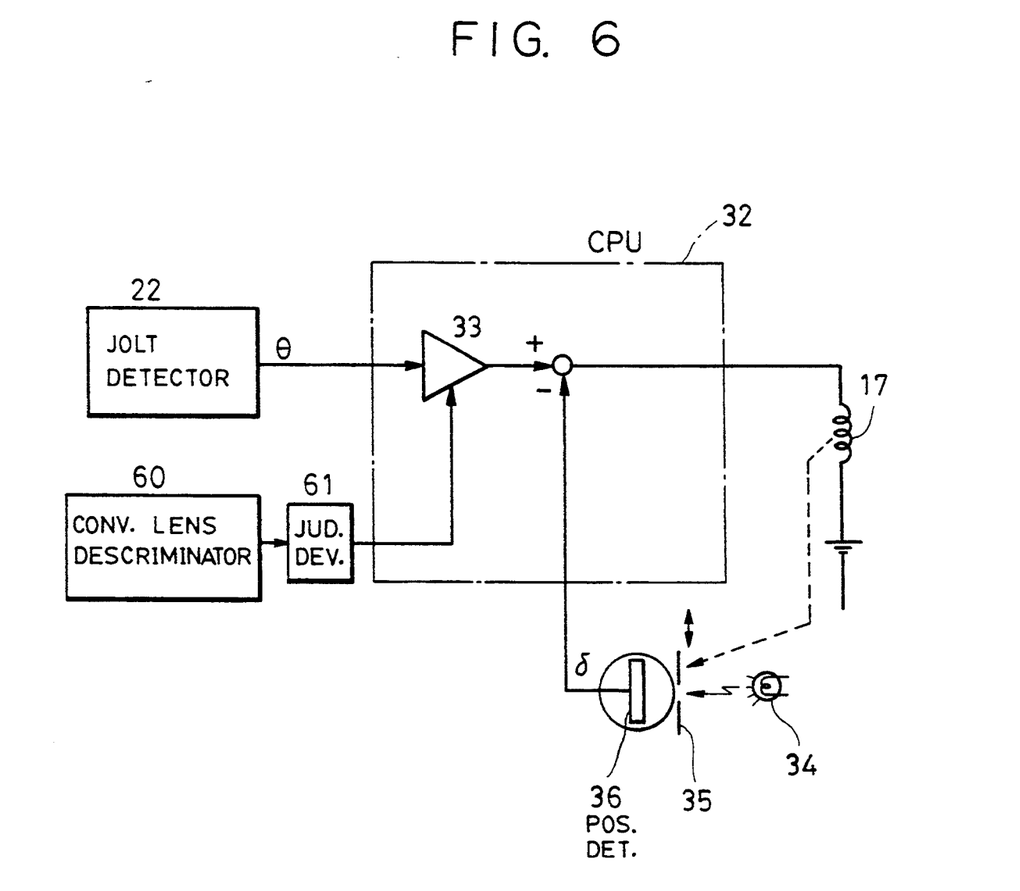
FIG. 6 is a circuit diagram related to FIG. 5, showing a drive circuit for varying the apex angle of a variable-apex-angle prism.

FIGS. 4 to 6 show a second embodiment of the present invention.

The reference numeral 50 indicates a conversion lens, and the reference numeral 51 indicates an image blur suppressing device. Provided on the front surface of the image blur suppressing device 51 are a plurality of contacts 52 to 55, and provided on the rear surface of the conversion lens 50, at some of the positions corresponding to the contacts 52 to 55, are contacts. FIG. 5 schematically shows the arrangement of the above contacts as well as the way they are connected together. A high level signal H is supplied to the contact 54 from the judgment device described below. The contacts 52, 53 and 55 are connected to the judgment device through the signal lines $T_1$, $T_2$ and W, respectively. Assuming that a tele-conversion lens 50a of 1.4× magnification ($\gamma = 1.4$) is attached, contacts 56 and 57 are provided at those positions thereof facing the contacts 52 and 54, with the contacts 56 and 57 being connected together within the tele-conversion lens 50a. In this case, only the signal $T_1$ attains a high level, with the result that the attached tele-conversion lens of 1.4× magnification is recognized as such. These contacts will be collectively referred to as a "conversion lens discrimination device 60". The signals $T_2$ and W respectively correspond to a tele-conversion lens of 2× magnification and a wide conversion lens. In the structure described above, contacts 56 to 59 are so arranged that the three types of conversion lens shown in FIG. 5, i.e., the tele-conversion lens of 1.4× magnification, the tele-conversion lens of 2.0× magnification, and the wide conversion lens of 0.7× magnification, as well as the condition where no conversion lens is attached, can be discriminated from each other. The attachment of the conversion lens 50 to the image blur suppressing device 51 is effected by means of a well-known bayonet structure, a description of which will be omitted here.

FIG. 6 is a block diagram showing the control circuit used in this embodiment. A detailed description thereof will be omitted since it is substantially the same as the control circuit of the first embodiment (FIG. 3). It only differs from the circuit of the first embodiment in that a judgment device 61 discriminates the signal from the conversion lens discrimination device 60, supplying a signal indicating whether the conversion lens is attached as well as the type of conversion lens to the CPU 32 and switching the amplification factor of the amplifier 33 as follows. That is, when $\gamma = 1.4\times$, the judgment device 61 switches the amplification factor of the amplifier 33 to $1.4/(n-1)$. When $\gamma = 2.0\times$ or $0.7\times$, it switches the amplification factor to $2.0/(n-1)$ or $0.7/(n-1)$.

The number of contacts may be changed in accordance with the number of types of conversion lens. The discrimination signals may be created by using contacts in some other form. Further, instead of discriminating the type of conversion lens electrically as described above, such a discrimination may be effected mechanically.

Figure 7:
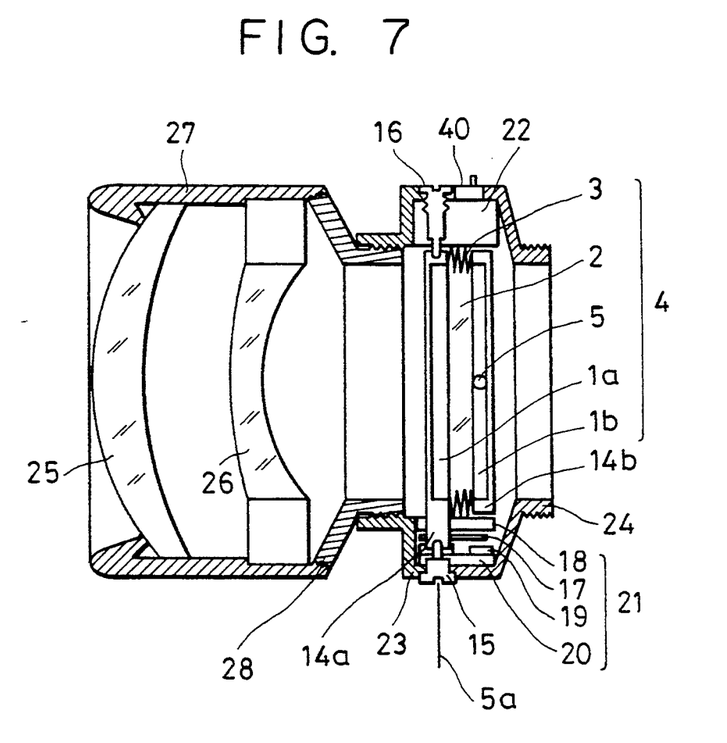
FIG. 7 is a sectional view showing an image blur suppressing device in accordance with this invention and a conversion lens.
Figure 8:
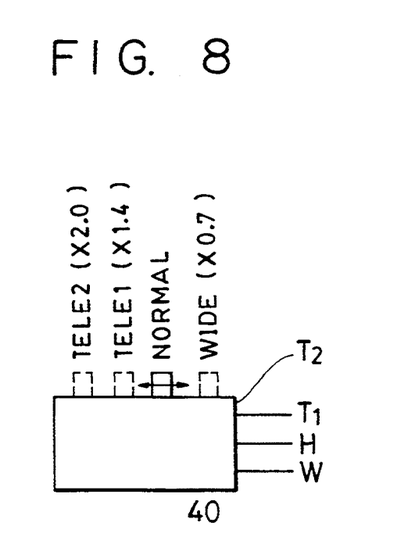
FIG. 8 is a diagram showing a mode switch for setting the type of conversion lens.
Figure 9:
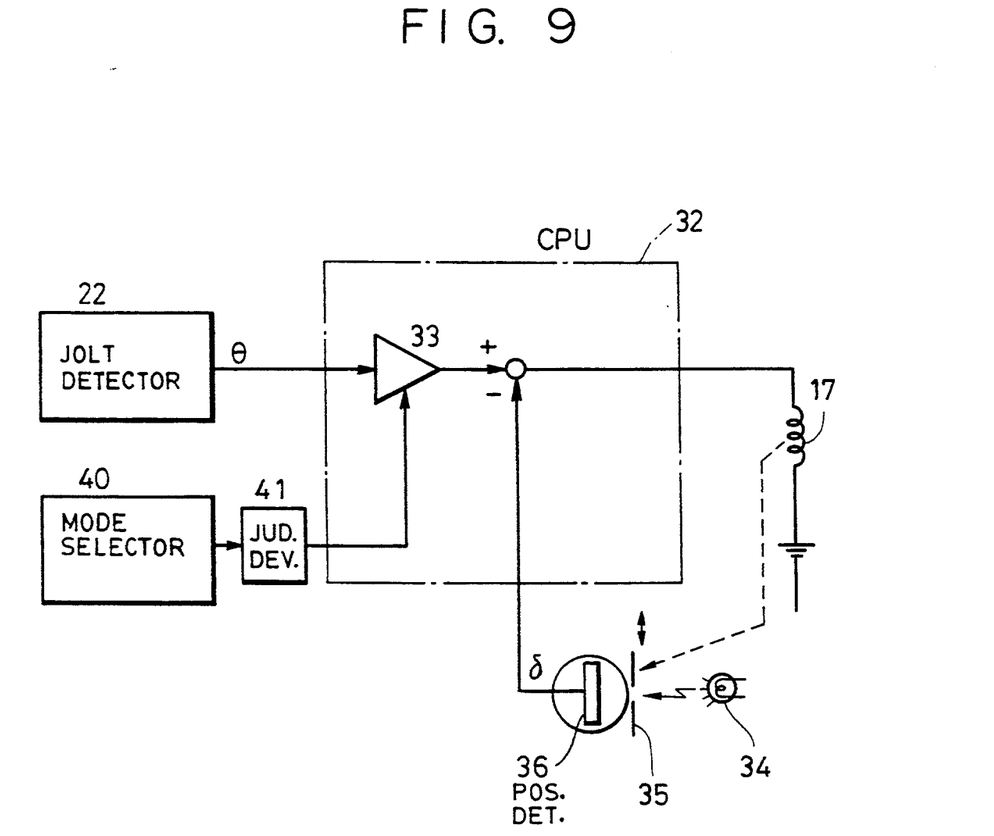
FIG. 9 is a circuit diagram related to FIG. 7, showing a drive circuit for varying the apex angle of a variable-apex-angle prism.

FIGS. 7 to 9 show a third embodiment of the present invention.

In the condition shown in FIG. 7, a conversion lens is attached to the image blur suppressing device described above. The reference numeral 40 indicates a mode selector using a switch of a standard mechanism having a plurality of positions. FIG. 8 shows this mode selector 40' in detail. The mode selector 40' of this embodiment has four positions, which are connected to the judgment device described below through four signal lines $T_2$, $T_1$, H and W, respectively, as shown in FIG. 8. A high level signal is supplied through the signal line H.

Of the four positions of the mode selector 40, the first one corresponds to the tele-conversion lens of 2.0× magnification. When this position is selected, the signal line H conducts to the signal line $T_2$. That is, only the signal $T_2$ becomes a high level signal, so that the judgment device can recognize that the selected position corresponds to the tele-conversion lens of 2.0× magnification. Likewise, the second, third and fourth positions cause signals, which respectively correspond to tele-conversion lens of 1.4× magnification, the absence of a conversion lens, and the wide conversion lens of 0.7× magnification, to be transmitted to the judgment device. As for the other sections of this embodiment, they are identical to those of the first embodiment, so that a description thereof will be omitted.

FIG. 9 is a block diagram showing the control circuit used in this embodiment. A detailed description of this control circuit will be omitted here since it is substantially the same as that of the first embodiment. It only differs from the circuit of the first embodiment in that, a judgment device 41 distinguishes the signal from the mode selector 40 and supplies a signal corresponding to the position of the mode selector to the CPU 32, with the amplification factor of the amplifier 33 being switched as in the second embodiment. While this embodiment employs a mode selector 40 corresponding to four predetermined magnification factors, this should not be construed as restrictive. The mode selector may correspond to a larger number of magnification factors, or, alternatively, a variable registor adapted to vary the magnification factor in an analog fashion may be used.

Further, while in the above embodiments a variable-apex-angle prism is used as the image blur suppressing device, it is also possible to use a device of the type in which image deflection is effected through parallel decentering of an optical lens.

Further, while in the above embodiments the image blur suppressing device is attached in front of the photographic lens, it is also possible for this device to be provided within the photographic lens.

Thus, in accordance with this invention, the ratio of the operational amount of compensation to the deflection angle can be changed such that the operational amount of the image blur suppressing device, i.e., the image deflection amount, attains an appropriate value, thereby enabling the image blur suppressing device to properly function even when a conversion lens is attached in front of it.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photographic system for stabilizing a photographically formed image, comprising:
   a photographic lens means for forming said image;
   a light refraction means for causing light refraction in order to stabilize the image;

a conversion lens means for converting the focal length of said photographic lens means; and a means for varying the light refraction amount of said light refraction means in accordance with whether said conversion lens means is attached.

2. A photographic system according to claim 1, wherein said light refraction means is detachably provided between said photographic lens means and said conversion lens means.

3. A photographic system according to claim 2, further comprising a lens detection means for detecting whether said conversion lens means is attached, said means for varying the light refraction amount being adapted to vary the light refraction amount in accordance with a detection signal supplied from said lens detection means.

4. A photographic system according to claim 3, wherein said lens detection means further detects the type of said conversion lens means.

5. A photographic system according to claim 2, further comprising a setting means for setting the presence or absence of said optical conversion lens means, said means for varying the light refraction amount being adapted to vary said light refraction amount in accordance with the setting of said setting means.

6. An image stabilizing device which is provided between a photographic lens and a conversion lens means for converting the focal length of said photographic lens and which is adapted to stabilize images formed by said photographic lens, comprising:

a light refraction means for causing light refraction; and a means for varying the light refraction amount of said light refraction means in accordance with whether said conversion lens means is attached.

7. A device according to claim 6, further comprising a lens detection means for detecting whether said conversion lens means is attached, said means for varying the light refraction amount being adapted to vary the light refraction amount in accordance with a detection signal supplied from said lens detection means.

8. A device according to claim 7, wherein said lens detection means further detects the type of said conversion lens means.

9. A device according to claim 7, further comprising a setting means for setting the presence or absence of said conversion lens means, said means for varying the light refraction amount being adapted to vary said light refraction amount in accordance with the setting of said setting means.

10. An image stabilizing system comprising:

an objective lens means;

a variable-apex-angle prism means for stabilizing an image, which is arranged at the rear of said objective lens means to refract light; and means for varying a light deflection angle of said variable-apex-angle prism means in accordance with the optical characteristics of said objective lens means.

11. An image stabilizing system according to claim 10, wherein said objective lens means is detachably mounted in the optic axis of said variable-apex-angle prism means.

12. An image stabilizing system according to claim 11, further comprising a distinguishing means for distinguishing the type of said objective lens means, said varying means varying the light deflection amount in accordance with the type of said objective lens means.

13. An image stabilizing system according to claim 10, wherein said objective lens means comprises a conversion lens.

* * * * *

UNITED STATES PATENT AND TRADEMARK OFFICE
CERTIFICATE OF CORRECTION

PATENT NO. : 5,394,207

DATED : February 28, 1995

INVENTOR(S) : TATSUO FUJISAKI

It is certified that error appears in the above-indentified patent and that said Letters Patent is hereby corrected as shown below:

Title page, item [56]

"61-223819 5/1990 Japan" should read --61-223819 10/1986 Japan--

Drawings:

SHEET 5

Figure 6, "DESCRIMINATOR" should read --DISCRIMINATOR--

COLUMN 1

Line 4, "a" should read --a continuation of--.

COLUMN 8

Line 21, "means" should read --a means--

Signed and Sealed this

Thirtieth Day of May, 1995

Attest:

BRUCE LEHMAN

Attesting Officer

Commissioner of Patents and Trademarks